(12) United States Patent
Creasey

(10) Patent No.: US 8,361,938 B1
(45) Date of Patent: Jan. 29, 2013

(54) STUCK PIPE AND WELL STIMULATION ADDITIVE AND METHOD

(75) Inventor: David H. Creasey, Boerne, TX (US)

(73) Assignee: Contact Marketing Solutions, LLC, Danbury, CT (US)

( * ) Notice: Subject to any disclaimer, the term of this patent is extended or adjusted under 35 U.S.C. 154(b) by 531 days.

(21) Appl. No.: 12/644,593

(22) Filed: Dec. 22, 2009

Related U.S. Application Data

(60) Provisional application No. 61/140,291, filed on Dec. 23, 2008.

(51) Int. Cl.
*C09K 8/74* (2006.01)

(52) U.S. Cl. .................... 507/269; 166/305.1

(58) Field of Classification Search .............. 507/269; 166/305.1
See application file for complete search history.

(56) References Cited

U.S. PATENT DOCUMENTS

| | | | |
|---|---|---|---|
| 4,436,638 A | 3/1984 | Walker et al. | |
| 4,464,269 A | 8/1984 | Walker et al. | |
| 4,614,235 A | 9/1986 | Keener et al. | |
| 5,247,992 A | 9/1993 | Lockhart | |
| 5,669,446 A * | 9/1997 | Walker et al. | 166/300 |
| 5,989,595 A | 11/1999 | Cummins | |
| 6,242,011 B1 | 6/2001 | Cummins | |
| 7,033,976 B2 | 4/2006 | Guzman | |
| 7,198,103 B2 | 4/2007 | Campbell | |
| 7,278,481 B2 | 10/2007 | Eken | |
| 7,360,595 B2 | 4/2008 | Zupanick et al. | |
| 7,380,606 B2 | 6/2008 | Pursley et al. | |
| 7,419,223 B2 | 9/2008 | Seams | |
| 2006/0234872 A1 * | 10/2006 | Mirakyan et al. | 507/211 |

* cited by examiner

*Primary Examiner* — Alicia Toscano
(74) *Attorney, Agent, or Firm* — McCarter & English

(57) ABSTRACT

An aqueous or oil-based mixture containing a non-toxic, low pH, antimicrobial, acidic composition having a pH between approximately 0.5 and approximately 3.5 with and without a proppant is used as a subterranean well stimulation additive. Without a proppant, the LpHAC stimulation additive is used for acidization. In another embodiment, with a proppant, the LpHAC stimulation fluid is used in hydraulic fracturing. As a well stimulation fluid, it involves the injection of specially engineered fluids and other materials into the well bore at rates that actually cause the cracking or fracturing of the reservoir formation to create fissures or cracks in the formation to increase fluid flow of underground resources from the reservoir into the well bore.

18 Claims, 7 Drawing Sheets

STUCK PIPE AND WELL STIMULATION ADDITIVE AND METHOD

This invention claims priority based on U.S. Provisional Application Ser. No. 61/140,291 filed on Dec. 23, 2008, which is incorporated herein by reference.

FIELD OF THE INVENTION

This invention relates to a process and composition effective in well stimulation in a well production or completion operation and the release of stuck pipe in a borehole during a drilling operation and, more specifically, to an additive to a water based, or oil based system that is environmentally safe and effective in fracturing a subterranean formation by reacting with limestone, silica, dolomite, shale and the like which are found in oil and gas producing zones. The well stimulation additive is used with and without a natural proppant, such as sand or a synthetic proppant, such as polymeric beads or ceramic beads.

BACKGROUND AND PRIOR ART

Well Stimulation.

Oil and gas well stimulation plays a vital role in production operations. With oil and gas prices at all-time highs in 2008, it is imperative from an oil or gas company's perspective and a consumer's perspective that as much production as possible be safely extracted from the subterranean reservoir.

Natural production tendencies for wells are for the oil or gas production rates, and reservoir pressure, to be at its highest at initial production, and fall-off considerably as the well is produced. Typically, oil rates decline as water production increases causing the permeability of the reservoir to decrease, thereby reducing flow of fluid to the perforations in the casing of the well bore, driving up operating costs while revenue shrinks. This scenario continues until the well fails and/or becomes uneconomic to operate or repair. Thus, the purpose of oil or gas well stimulation is to increase a well's productivity by restoring oil production to original rates less normal decline, or to boost production above normal predictions.

Stimulation operations can be focused solely on the wellbore or on the reservoir, it can be conducted on old wells and new wells alike; and it can be designed for remedial purposes or for enhanced production. There are two main types of stimulation operations, matrix acidization and hydraulic fracturing.

Matrix acidization involves the placement of acid within the wellbore at rates and pressures designed to attack an impediment to production without fracturing or damaging the reservoir. Typically, hydrofluoric acid is used for sandstone/silica-based problems, and hydrochloric acid or acetic acid is used for limestone/carbonate-based problems. Most matrix stimulation operations target up to a ten foot radius in the reservoir surrounding the wellbore.

Hydraulic fracturing, which includes acid fracturing, involves the injection of a variety of fluids and other materials into the well at rates that actually cause the cracking or fracturing of the reservoir formation. The variety of material includes, but is not limited to, water, acid, special polymer gels, and sand. The fracturing of the reservoir rock and the subsequent filling of the fractured voids with sand ("proppant") or the creation of acid channels allows for an enhanced conduit to the wellbore from distances in excess of a hundred feet.

The following patents discuss methods and systems for stimulating oil or gas production from subterranean wells: U.S. Pat. No. 7,198,103 to Campbell, Method for Stimulating a Petroleum Well; U.S. Pat. No. 7,278,481 to Eken, Method and System for Producing an Oil and Gas Mixture through a Well; U.S. Pat. No. 7,360,595 to Zupanick et al., Method and System for Underground Treatment of Materials; U.S. Pat. No. 7,380,606 to Pursley et al., Composition and Process for Well Cleaning; U.S. Pat. No. 7,419,223 to Seams, System and Method for Enhancing Permeability of a subterranean Zone at a Horizontal Well Bore.

Collectively, the above references describe a variety of stimulants or well stimulation methods that are either oil based or use synthetic compositions injected into the well and recovered, when possible. Often the well stimulation additives and methods include the use of caustic, harsh acids, such as sulfuric acid, hydrofluoric acid, hydrochloric acid and the like or combustible or flammable liquids. The prior art stimulation additives are harmful to equipment, people who work in the industry, and create disposal hazards in the environment. Even more alarming are reports from landowners that hydraulic fracturing of oil and gas wells has allegedly contaminated underground drinking water because aquifers are known to exist in and around formations with fluid underground resources, such as, natural gas, oil and water.

There is a need for a well stimulation additive and method that is heat tolerant, not pressure sensitive, not harmful to the environment or health of human workers in the well drilling industry and, importantly, can be disposed of without detrimental environmental impact to animals, land or water. The present invention fulfills that need.

Stuck Drill Pipe

Another aspect of drilling oil and gas wells involves drilling through subterranean and geological formations wherein, specialized drilling fluids, referred to as "muds," are used to help maintain well control and to remove drill cuttings from the hole. The drilling pipe or string can become stuck in the hole, causing catastrophic delays in drilling, significant loss of time and money. There are a number of causes which may contribute to the stuck drill pipe problem including hole cave-in, blow-outs, mud or filter cake buildup in the bore hole. It is essential to free the stuck drill pipe as quickly as possible, with the least amount of down time and the least amount of damage to equipment, the environment and the operators.

Historically, either water-based muds (WBMs) or oil-based muds (OBMs) have been used for offshore wells. Recently, in response to U.S. Environmental Protection Agency (EPA) regulations and drilling-waste discharge requirements imposed by North Sea nations, the drilling industry has developed several types of synthetic-based muds (SBMs) that combine the desirable operating qualities of OBMs with the lower toxicity and environmental impact qualities of WBMs.

Each drilling fluid has positive and negative features. For example, on the positive side, water-based muds (WBMs) do not release free oil, are usually without toxic contaminants such as cadmium and mercury, are typically discharged at the well site and are widely used in shallow wells and in shallower portions of deeper wells; however, on the negative side, in deep or extended-reach wells, the performance of WBMs is often poor. Thus, for deep well intervals and complex drilling situations, oil-based muds (OBMs) and synthetic-based muds (SBMs) are needed for their superior performance.

The problem with OBMs is that U.S. Environmental Protection Agency (EPA) guidelines prohibit release of free oil, as detected by the static sheen test, from drilling fluids and drill cuttings discharges. Thus, OBMs must be recycled and cannot be discharged on-site, so there is the added cost of hauling and disposing of wastes onshore and long-term liability concerns associated with onshore disposal sites. OBMs also pose greater risk to workers through skin irritation and the effects of inhalation. Thus, despite their unique and valuable properties widespread use of OBMs is severely limited.

With regard to synthetic-based muds (SMBs), the synthetic liquid forms the continuous phase, while brine serves as the dispersed phase. The synthetic based fluids are classified according to the molecular structure as, esters (synthesized from fatty acids and alcohols), ethers, usually synthesized from alcohols (U.S. Pat. No. 4,614,235 to Keener et al.), poly-alphaolefins (manufactured by the catalytic polymerization of linear alpha-olefins), olefin isomers (manufactured by selective isomerization of normal alpha-olefins) and other base compounds are reported.

An oil-based stuck pipe additive containing propoxylated $C_{18}$-$C_{32}$ alkanols, an oil-soluble emulsifier-wetting agent and if desired an imidazoline for high temperature emulsion stability is reported in U.S. Pat. No. 4,436,638 and U.S. Pat. No. 4,464,269 to Walker et al.

SBMs have a wide range of chemical properties, drilling performance and environmental impacts, advantages and disadvantages for drilling operations and disposal of cuttings. For example, SBMs have drilling and operational properties similar to OBM systems and are used where OBMs are commonly used in difficult drilling situations, such as, high downhole temperatures, hydratable shales or salt, where the properties of WMBs would limit performance. Experience has shown that SBMs have higher cost, superior drilling performance and lower environmental impact than OBMs. SBMs must be recycled, with only the cuttings and a small amount of associated drilling fluids being disposed of on-site, if EPA and other environmental regulations will permit. Since 1990, several low-toxicity, biodegradable SBMs have entered the market. However, restrictions on discharge of cuttings pose a barrier to their use.

U.S. Pat. No. 5,247,992 to Lockhart describes a fluid for releasing stuck drill pipe that contains one or more carboxylic acids with specific chemical and physical properties.

In U.S. Pat. No. 7,033,976 B2 to Guzman a fluid system additive for use in hydrocarbon exploitation used a biopolymer derived from at least one species of the banana family that allegedly reduces the costs and environmental effects of existing additives.

Nonetheless, a drilling mud or stuck pipe additive is still needed by the drilling industry that provides superior drilling performance, low environmental impact, no release of oil, reasonable cost, and no toxicity to man or the environment.

In addition, the drilling industry needs fluid compositions and methods for production operations and remedial operations of all kinds, throughout a well's life, including well stimulation to increase productivity. It is desirable that the fluid compositions and methods have low environmental impact, reasonable cost, little or no toxicity to man or the environment.

The present invention fulfills many of the needed attributes of a stuck pipe additive and provides a fluid system additive that supports and improves the efficiency of a water-based mud (WBM) system and a well stimulation system for the drilling industry.

SUMMARY OF THE INVENTION

A first objective of the present invention is to provide a stuck pipe additive that provides superior subterranean drilling performance.

A second objective of the present invention is to provide a stuck pipe additive that is non-toxic to the environment.

A third objective of the present invention is to provide a stuck pipe additive with low environmental impact.

A fourth objective of the present invention is to provide a stuck pipe additive that is used as a spotting fluid to free a stuck drill stem in the annulus of a bore hole.

A fifth objective of the present invention is to provide a stuck pipe additive that permits drill cuttings and associated drilling fluids to be disposed of on-site.

A sixth objective of the present invention is to provide a stuck pipe additive that meets national and local regulatory guidelines imposed on the drilling industry.

A seventh objective of the present invention is to provide a stuck pipe additive that is non-toxic to humans and marine life.

Additional objectives directed to well stimulation are:

An eighth objective of the present invention is to provide a well stimulation additive and method to increase well productivity and life.

A ninth objective of the present invention is provide a well stimulation additive including an acidizing fluid, water and proppant to fracture a subterranean formation and thereby increase the flow rate of oil or gas from a subterranean reservoir.

A tenth objective of the present invention is to provide a well stimulation additive including an acidizing fluid, oil and proppant to fracture a subterranean formation to increase the flow rate of oil or gas from a subterranean reservoir.

An eleventh objective of the present invention is to provide well stimulation additive comprising an acidizing fluid suitable for use with water or oil that is not pressure sensitive, that is environmentally acceptable and not harmful to humans and when neutralized can be disposed of on land or water.

A preferred method for stimulating the production of a subterranean oil or gas well, consists of selecting a subterranean zone with underground resources in a reservoir that is penetrated by a well bore, then preparing a mixture of a stimulation fluid consisting of a non-toxic, low pH acidic composition with antimicrobial properties, an aqueous based continuous phase that has the characteristics of brine and a proppant, and pumping the mixture of stimulation fluid and proppant into the well bore under a predetermined pressure and in a predetermined volume to fracture the formation and permit the underground resource to flow from the reservoir into the well bore.

A more preferred method of stimulating well production includes using a stimulation fluid that is a non-toxic, low pH acidic composition prepared by the process of combining a high purity inorganic acid with water and an ammonium compound, heating the mixture to approximately 140° F. to form mixture (I), placing mixture (I) in a pressurized vessel and heating the mixture, under pressure, to temperatures in a range between approximately 200 F and 400 F, then, cooling the mixture, after the mixture is cooled, adding a stabilizing amount of the starting mixture (I). In this composition it is preferred that the aqueous based continuous phase of the stimulating fluid is brine, more preferably, sea water. It is preferred that the mixing ratio of sea water to low pH acidic composition is in a range between approximately 10 weight percent to approximately 40 weight percent of total mixture of sea water and low pH acidic composition.

It is also preferred that the mixture of sea water and low pH acidic composition is pumped to the bottom of the drill pipe during the drilling operation.

It is preferred that the high purity inorganic acid of the low pH acidic composition is selected from the group consisting of sulfuric acid, phosphoric acid, fumaric acid and acetic acid.

It is also preferred that the ammonium compound of the low pH acidic composition is selected from the group consisting of anhydrous ammonia, ammonium sulfate and buffered ammonium nitrate. A metallic sulfate can be used in place of the ammonium compound. It is preferred that the metallic sulfate is selected from the group consisting of sodium sulfate, sodium bisulfate, magnesium sulfate, zinc sulfate, manganese sulfate, and copper sulfate.

Another preferred method for stimulating the production of a subterranean oil or gas well includes selecting a subterranean zone with underground resources in a reservoir that is in contact with a well bore, preparing a mixture of a stimulation fluid consisting of a non-toxic, low pH acidic composition with antimicrobial properties, an oil-based continuous phase, and a proppant, then pumping the stimulation fluid mixture into the well bore under a predetermined pressure and in a predetermined volume to fracture the formation and permit the underground resource to flow from the reservoir into the well bore.

It is preferred that the stimulation fluid is a non-toxic, low pH acidic composition prepared by the process of combining a high purity inorganic acid with water and an ammonium compound, heating the mixture to approximately 140° F. to form mixture (I), placing mixture (I) in a pressurized vessel and heating the mixture, under pressure, to temperatures in a range between approximately 200 F and 400 F, then, cooling the mixture, after the mixture is cooled, adding a stabilizing amount of the starting mixture (I).

It is also preferred that the oil-based continuous phase is at least one of diesel oil, crude oil, and a mixture thereof. The preferred mixing ratio of oil phase to low pH acidic composition is in a range between approximately 10 weight % to approximately 35 weight % low pH acidic composition to the total weight of oil and low pH acidic composition.

Preferably, the mixture of oil and low pH acidic composition is pumped to the bottom of the drill pipe, through a casing and into a reservoir formation under pressures between approximately 5 psi and approximately 10,000 psi.

It is preferred that the proppant in a mixture of stimulation fluid and proppant is selected from the group consisting of sand, ceramic beads and polymeric beads.

It is also preferred that a non-toxic, low pH acidic composition is prepared by the process of combining a high purity inorganic acid with water and an organic sulfate, heating the mixture to approximately 140° F. to form mixture (II), placing mixture (II) in a pressurized vessel and heating the mixture, under pressure, to temperatures in a range between approximately 200 F and 400 F, then, cooling the mixture, after the mixture is cooled, adding a stabilizing amount of the starting mixture (II). Preferably, the organic sulfate has a generic formula C—H—O—S, wherein C is carbon, H is hydrogen, O is oxygen and S is sulfur.

It is also preferred that the organic sulfate further include an alkali metal selected from the group consisting of potassium and sodium.

A preferred well stimulation fluid consists of a non-toxic, low pH acidic composition with antimicrobial properties, an aqueous based continuous phase that has the characteristics of brine and a proppant.

Another preferred well stimulation fluid consists of a non-toxic, low pH acidic composition with antimicrobial properties, an oil-based continuous phase selected from at least one of diesel oil, crude oil and a mixture thereof, and a proppant.

A further preferred well stimulation fluid consists of a non-toxic, low pH acidic composition with antimicrobial properties, a continuous liquid phase selected from at least one of water, brine, seawater, diesel oil, crude oil and a mixture thereof, and a proppant.

And another preferred well stimulation fluid consists of a non-toxic, low pH acidic composition with antimicrobial properties, a continuous liquid phase selected from at least one of water, brine, seawater, diesel oil, crude oil and a mixture thereof.

A preferred stuck pipe additive for drilling in subterranean formations with shale consists of, in combination, approximately 5% to approximately 15% of low pH acid composition, approximately 1% to approximately 10% of hydrochloric acid, and approximately 75% to approximately 93% of water.

Further objects and advantages of this invention will be apparent from the following detailed description of a presently preferred embodiment, which is illustrated in the accompanying drawings.

DESCRIPTION OF THE PREFERRED EMBODIMENT

Figure 1:
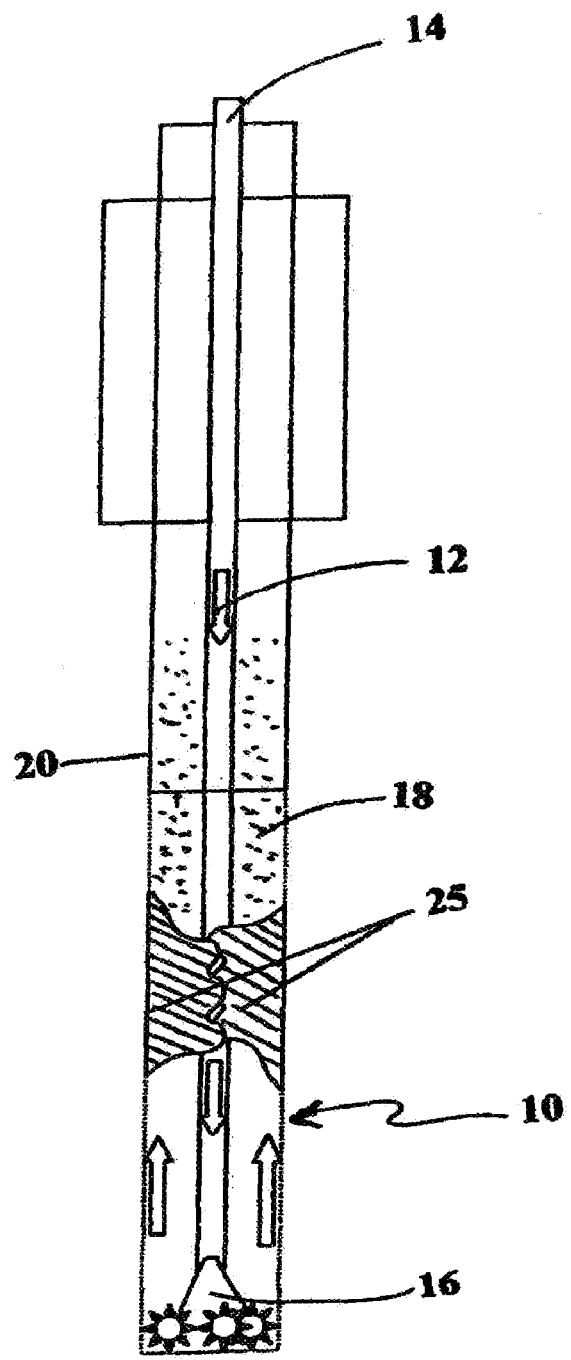
FIG. 1 is a schematic illustration of the LpHAC being used as a spotting fluid to release a stuck pipe caused by discharge mud forming a cake in the annulus of the bore hole.

Before explaining the disclosed embodiment of the present invention in detail, it is to be understood that the invention is not limited in its application to the details of the particular arrangement shown since the invention is capable of other embodiments. Also, the terminology used herein is for the purpose of description and not of limitation.

It would be useful to discuss the meanings of some words used herein and their applications before discussing the compositions of matter and method of using and making a drilling mud additive therefrom.

"Annulus" is the space within a bore hole between the drill string and the well wall through which mud and drill cutting travel upward to the surface.

"Drilling fluid" or "drilling mud" is used interchangeably herein to refer to fluids used to minimize problems associated with filter cake formations when drilling through subterranean and geological formations.

"LpHAC" is used to refer to a low pH acidic composition as described herein and as described and/or claimed in U.S. Pat. No. 5,989,595 or 6,242,011 B1 both to Cummins, and U.S. patent application Ser. No. 11/293,535 filed Dec. 2, 2005 to Cummins and Creasey, which are incorporated herein by reference.

"Non-toxic" is used herein to mean not an irritant or deleterious to humans or the environment when used in quantities and weight ratios specified in the present invention for drilling fluids or well stimulation fluids.

"Proppant" refers to sized particles mixed with fracturing fluid to hold fractures open after a hydraulic fracturing treatment. In addition to naturally occurring sand grains, man-made or specially engineered proppants, such as resin-coated sand or high-strength ceramic materials like sintered bauxite, may also be used. Proppant materials are carefully sorted for size and spherical shape to provide an efficient conduit for production of fluid from the reservoir to the well bore.

The ideal proppant has a large spherical shape, superior strength against pressure, temperature and has minimal binding properties with contaminants in a well bore. In some wells that have compatible reservoirs, a polymer bead or sand may be adequate, but in reservoirs that have soft formations and have high pressure as well as high temperatures, ceramic beads may be needed.

"Well stimulation" is a general term describing a variety of operations performed on a well to improve its productivity.

In U.S. Pat. Nos. 5,989,595 and 6,242,011 B1 to Cummins, and U.S. patent application Ser. No. 11/293,535 filed Dec. 2, 2005 to Cummins and Creasey, a low pH acidic composition of matter is disclosed that is useful for destroying microorganisms that spoil food, such as fish. The composition of matter in the Cummins patents and Cummins and Creasey patent application referenced above is also useful for skin treatment of melanoma and the treatment of other bacteria, and serves as a component of the well stimulation additive, drilling fluids and stuck pipe additives disclosed herein.

In general, the process for preparing a LpHAC that is not an irritant or deleterious to humans includes combining a strong, low pH acid, selected from at least one of, 98% purity sulfuric acid, phosphoric acid, fumaric acid or acetic acid with water, preferably distilled water, deionized water, filtered water or the like and an ammonium compound or urea or a metallic sulfate to provide mixture (I), combining mixture (I) in a pressurized vessel and heating the mixture to temperatures in a range between approximately 200 F and approximately 800 F, then cooling the mixture. After the mixture is cooled, a stabilizing amount of the starting mixture (I) is added. Further detail describing the production of LpHAC compounds is provided in the Cummins patents referenced above and the Cummins and Creasey patent application referenced above; the content of which is incorporated herein by reference.

The ammonium compound is preferably anhydrous ammonia, ammonium sulfate, and buffered ammonium nitrate used in a ratio of approximately 1 lb. to approximately 5 lbs. of ammonium compound per gallon of water in mixture (I). The ammonium compound or judiciously substituted compounds are the key ingredient for making the LpHAC used herein as a stuck pipe additive, drilling mud or spotting fluid and also a well stimulation additive.

Urea or a metallic sulfate, such as sodium sulfate, sodium bisulfate, magnesium sulfate, zinc sulfate, manganese sulfate, and copper sulfate can be substituted for the ammonium compound. Commercially available organic sulfates and organic sulfites such as those available from Sigma Aldrich, a global Life Science and High Technology company with corporate headquarters in St. Louis, Mo. are suitable as a reactant in the process of preparing the low pH acidic composition of the present invention.

Below is an excerpt of a Sigma-Aldrich Product Catalog of Nov. 11, 2008* http://www.signaaldrich.com/chemistry/chemistry-products.html?TablePage=16251776; the entire listing of organic sulfates and organic sulfites is incorporated herein by reference and may be substituted for the ammonium compound in the quantities and ratios provided above.

| *Description | Molecular Formula |
|---|---|
| Potassium methyl sulfate purum | $CH_3 KO_4 S$ |
| Formaldehyde-sodium bisulfite adduct | $CH_3 NaO_4 S$ |
| Methyl sulfate sodium salt | $CH_3 NaO_4 S$ |
| Ethylene sulfite | $C_2 H_4 O_3 S$ |
| Dimethyl sulfite | $C_2 H_6 O_3 S$ |
| Diethyl sulfite | $C_4 H_{10} O_3$ |
| Dipropyl sulfate purum | $C_6 H_{14} O_4 S$ |
| Sodium dodecyl sulfate | $C_{12} H_{25} NaO_4 S$ |
| Ammonium lauryl sulfate | $C_{12} H_{29} NO_4 S$ |

The LpHAC prepared by the process above behaves as a buffered acid in this application.

The following physical and chemical properties of one embodiment of the LpHAC comprising a strong low pH acid and sodium sulfate when undiluted are as follows:

pH=−3; color is clear; specific gravity is between approximately 1.45 and approximately 1.53.

Stuck Pipe Additive and Method

In one embodiment of the disclosed drilling agents, the LpHAC can be incorporated into an aqueous based fluid in an amount ranging from approximately 4.0 milliliters (ml) to approximately 10 ml, preferably approximately 6.8 ml per gallon of aqueous based fluid. The formulation may also include optional viscosifying agents needed to make the drilling mud formulation compatible with solids weighting material to keep solids in suspension. The viscosifier is present in a range from approximately 5 weight percent to approximately 20 weight percent of the total solution, based on the selection of viscosifier and conditions in the bore hole.

A suitable viscosifier is also used in the stuck pipe fluid compositions of the present invention to thicken, stabilize and form a slurry of the suspended solids. Any suitable viscosifier may be used. Preferably, the viscosifier is a non-toxic, organic material such as a gum, a gel and the like.

The aqueous based continuous phase component of the drilling fluid of the present invention may generally be any water based fluid phase that is suitable for use in a drilling fluid. Preferably, the aqueous based continuous phase is selected from the group comprising fresh water, sea water, brine, mixtures of water and non-toxic water soluble organic compounds, or mixtures thereof. The amount of the aqueous based continuous phase component in the drilling fluid of the present invention will vary, depending on the drilling application and the nature of the conditions in the subterranean bore hole. Typically, the amount of the aqueous based continuous phase may range from nearly 100% of the drilling fluid to less than approximately 20% of the drilling fluid by volume.

As a drilling mud additive, an aqueous solution of LpHAC functions to breakdown a wall cake deposited on the well bore face and brings cuttings to the surface for disposal while stabilizing the bore hole. Downtime for stuck pipe may be drastically reduced and neither workers nor the environment are harmed by use of the stuck pipe additive of the present invention.

During the drilling of a subterranean well 10, a drilling fluid or "mud" 12 is pumped to the bottom of the well through the hollow drill pipe 12 as illustrated in FIG. 1. The drilling mud 12 cools the rotating drill bit 16 and serves to transport the rock or drill cuttings 18 to the top of the well through the annulus between the drill pipe and the borehole wall 20. An appropriate drilling fluid is also useful in maintaining the pressure balance between geological formations and the bore hole, lubricating the bit and drill string, reducing friction in the bore hole, sealing permeable formations.

Under most conditions drill cuttings 18 can also form a filter cake 25 on the walls of the bore hole, particularly in more permeable rock formations, such as limestone. The filter cake 25 hardens and becomes packed around the well bore. In a water-based mud (WBM) system the drill stem 14 has less ability to handle increased mud weights which allows high cutting solid removal, and higher drag on the drill stem leads to lost circulation. Lost circulation is a condition where drill cuttings 18 are not brought to the surface for removal and mud flow 12 is stopped. When the cuttings 18 pack around the drill stem 14, the drill stem 14 cannot be removed from the pipe and the drilling operation must cease until the stuck pipe is released, as shown in FIG. 1.

Use of a spotting fluid such as the stuck pipe additive composition disclosed herein is necessary to clear up the lost circulation condition resulting from the filter cake build up.

Figure 2A:
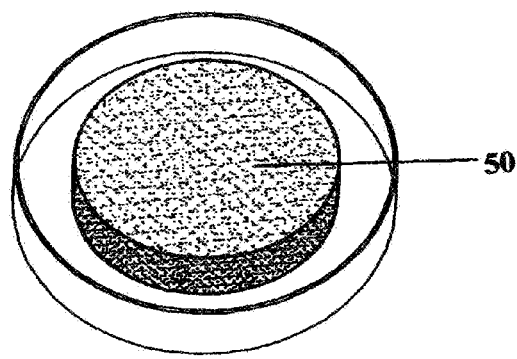
FIG. 2A shows mud discharge collected from a bore hole pressed into a solid filter cake at time zero, under ambient conditions.

FIG. 2A shows a compressed cake 50 of 13.7 pound per gallon filter cake mud taken from a drill hole and placed in a laboratory Petri dish at ambient conditions. Prior to being compressed, the 13.7 pound per gallon filter cake has the consistency of a thick peanut butter, with a viscosity of approximately 250,000 centipoise (cP) at 20° C. The cake 50 is compressed to remove most of the liquid to simulate a filter cake of drill cuttings that pack around the drill stem such that the drill stem cannot be removed from to the pipe during a drilling operation, as in a stuck pipe situation.

A stuck pipe additive comprising a mixture of 22 weight % of potassium chloride (KCl), 4 weight % sodium acid pyrophosphate (SAPP), 10 weight % of a low pH acid product (such as LpHAC) and 64 weight % water is added to the Petri dish in FIG. 2A.

Figure 2B:
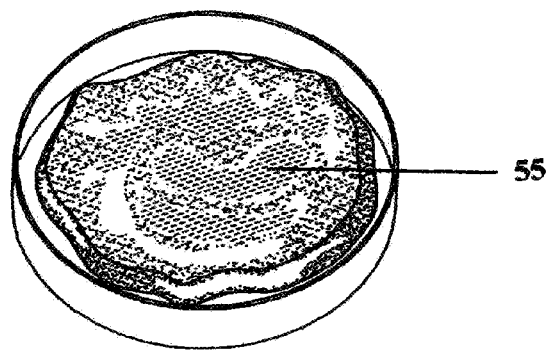
FIG. 2B shows the filter cake of FIG. 2A, approximately 4 minutes after treatment with the LpHAC spotting fluid composition of the present invention, under ambient conditions.

FIG. 2B shows the compressed cake 50 after approximately 4 minutes of exposure, in stagnant conditions, to the preferred stuck pipe additive of the present invention. The cake 55 has a much softer consistency and is broken apart into small flakes by the stuck pipe additive composition. The cake 55 now resembles the consistency of a soft and slightly runny composition, such as, ketchup with a viscosity of approximately 50,000 centipoise (cP) at 20° C.

Figure 2C:
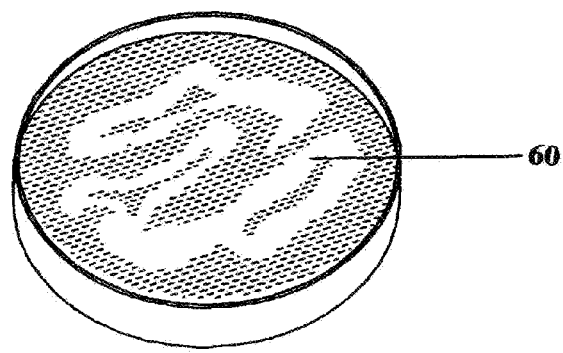
FIG. 2C show the filter cake of FIG. 2A, approximately 9 minutes after treatment with the LpHAC spotting fluid composition of the present invention, under ambient conditions.

FIG. 2C shows the dramatic change in theology of the filter cake 60 after approximately 9 minutes, when the consistency is that of a very light weight liquid such as a light machine oil with a viscosity of 102 centipoise (cP) at 20° C.

Thus, FIGS. 2A-2C illustrate the efficacy of the stuck pipe additive of the present invention in a stagnant condition at ambient temperatures. The compressed filter cake changes from a well-formed mass that causes a stuck pipe to a liquid material that releases or no longer binds a stuck pipe, in less than ten minutes under ambient conditions. The stuck pipe additive of the present invention comprises an alkali metal halide dehydrating agent, such as potassium chloride, sodium chloride or magnesium chloride that breaks the filter cake into small flakes and a quenching agent, such as, sodium acid pyrophosphate (SAPP) prevents rebinding.

Figure 3:
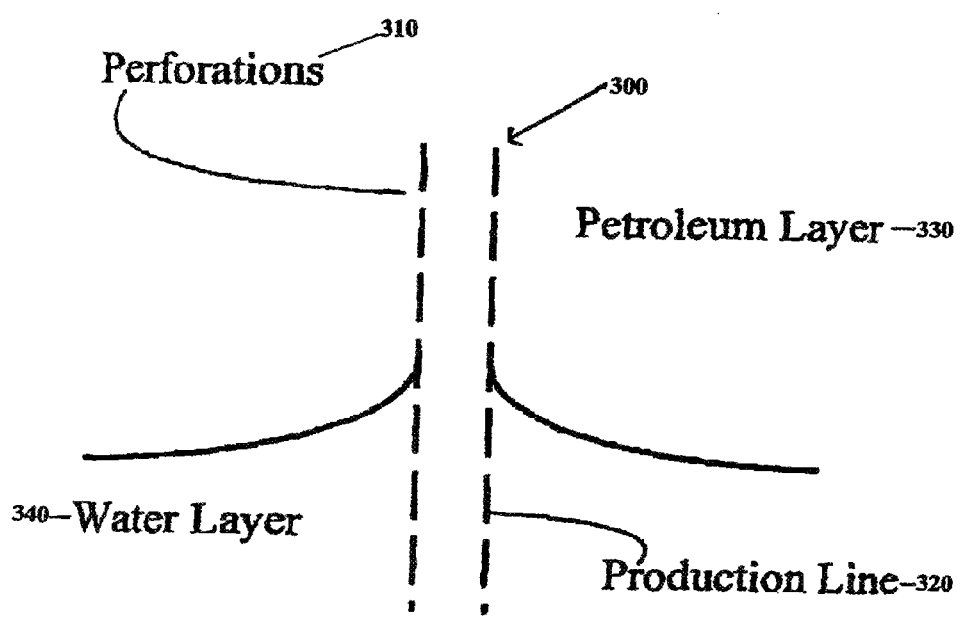
FIG. 3 is a schematic illustration of a wellbore showing untapped hydrocarbon in the uppermost portions of the reservoir atop any water present inside the reservoir.

FIG. 3 shows the environment of a typical well bore 300 showing perforations 310 in the pipe casing of the production line 320 which extends through a petroleum layer 330 that sits atop a water layer 340. Additives are needed in the drilling process to prevent caking and blocking of the perforations that allow petroleum layer to flow into the pipe line for extraction. Stimulants are needed to create fissures and cracks in the subterranean surfaces surrounding the petroleum layer allowing more petroleum to flow into the subterranean reservoir.

In field tests, it is demonstrated that the stuck pipe additive of the present invention performs even better in down hole conditions because of entrained carbonates from the drill cuttings that facilitate the break-up of the hardened filter cake.

Example 1

Stuck Pipe Additive Composition

| Compound | Weight Percent Range | Preferred Weight Percent |
|---|---|---|
| Example 1 - Stuck Pipe Additive Composition | | |
| Potassium chloride (KCl) | 10-35 | 22 |
| Sodium Acid pyrophosphate (SAPP) | 1-8 | 4 |
| Low pH acid product (LpHAC) | 0.5-50 | 10 |
| Water | 88.5-7 | 64 |

Based on laboratory tests using a variety of stuck pipe additive compositions, it is demonstrated that in less than approximately 10 minutes to less than approximately 2 hours, stuck pipe conditions can be eliminated, thus reducing overall drilling costs by decreasing downtime and other non-productive activities.

Example 2

Use of Stuck Pipe Additive as Spotting Fluid

The drill pipe can become stuck due to collapsed formation or lost circulation of cuttings as shown in FIG. 1, making rotation or removal of the drill pipe difficult or impossible. The drill stem becomes packed in the filter cake and can't go up or down causing a shut down of all operations. When this happens, chemicals known as spotting fluids can be pumped down the drill pipe into the drill stem to free the stuck pipe from the plug.

The stuck pipe additive composition of the present invention can effectively release the pipe from the particular filter cake that has resulted from the specific combination of mud types and rock formations in a bore hole. The formations are primarily carbonates from limestone, gypsum and the like. The carbonates are pH sensitive and when contacted with an acid, will crumble or break; the acid reacts with the carbonate in an effervescent manner, similar to an Alka-Seltzer® tablet dissolving in water. A spotting fluid composed of approximately 1 part to 90 parts LpHAC and 10 parts to 99 parts water (brine) is directed down the drill stem until the spotting fluid comes in contact with and saturates the plug.

Discharged material can be neutralized with sodium hydroxide or sodium bicarbonate to a neutral pH of approximately 6.5 to approximately 7.0, and then discarded on site.

The spotting fluid or the stuck pipe additive composition of the present invention is useful in clearing plugs and blockage that shut down subterranean drilling operations in a matter of a few minutes or a few hours, thus limiting a major source of productivity losses. Whether as a spotting fluid or a stuck pipe additive composition, the composition of the present invention is also non-toxic to the environment and personnel involved in the drilling operations, as such, the drill cuttings and discharges can be disposed of on site, and will not harm marine life, if the release of cuttings is in a marine environment.

Stuck Pipe Additive for Shale Formations

The stuck pipe additive for shale formation requires a modified formulation as shown in the Example 3 below:

Example 3

Stuck Pipe Additive Composition for Subterranean Formations with Shale

| Example 3 - Stuck Pipe Additive Composition for Subterranean Formations with Shale | | |
|---|---|---|
| Compound | Percent of Formulation | Target Formulation |
| Hydrochloric acid (HCl) 35% strength | 1-10% | 5-8 |
| Low pH acid product (LpHAC) | 6-65 | 8-10 |
| Water | 25-93 | 82-87 |

The additional LpHAC and hydrochloric acid (HCL) over the amounts of LpHAC used in Example 2 give the stuck pipe additive product the ability to break shale from around the drill pipe; shale can render the drill stem immobile. This problem is very widespread throughout the drilling industry. This kind of sticking is fast becoming the leading sticking problem, as deeper wells are being drilled. The current method of attacking this problem is to use straight HCl pill. The problem with this method, besides the health of drilling personnel and also the environment is that as the deeper well will have high temperatures and pressures, making HCl used alone, ineffective. The biggest problem, in this application for HCl is high temperatures.

HCl is very useful after it is stabilized with LpHAC. It retains some of its properties, and LpHAC adds even greater abilities which aids in destroying the shale at a high rate. By adding LpHAC to the HCl, this stabilization greatly reduces the negative health and environmental impact. The greatest quality that the LpHAC/HCl mixture takes on, is that the mixture is very stable from the effect of higher temperatures and can work under greater pressure without self-destruction. Thus, greater depths can be reached with reduced cost and time loss from shale stuck drill stems. An added benefit of the LpHAC/HCl mixture is that the impact of pure hydrochloric acid (HCl) on equipment is now greatly reduced.

Well Stimulation and Method

Figure 4:
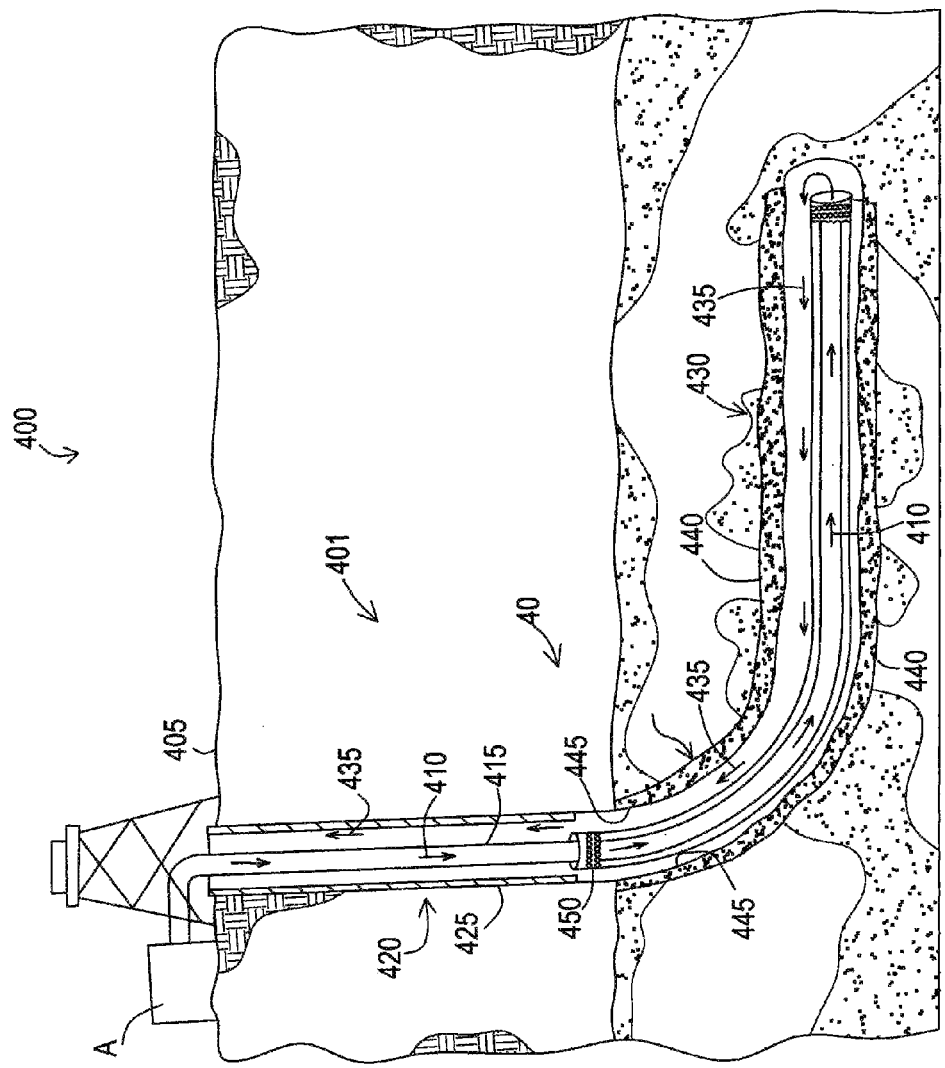
FIG. 4 is a cross-sectional view of a formation with a vertical and horizontal bore showing the introduction of well stimulation fluids pumped into a subterranean reservoir and used as a drilling fluid.

FIG. 4 shows a vertical and horizontal well bore as reported in U.S. Pat. No. 7,419,223 to D. P. Seams. In FIG. 4, a cross-sectional view of vertical/horizontal well bore 400 into surface 405 shows a drilling fluid extraction system 401. The drilling fluid of the present invention 410 is pumped into the vertical portion 420 of the well having a well casing 425 and an inner conduit or pipe 415. The fluid movement apparatus A is used to pump or force the drilling fluid 410 into the horizontal or lateral well bore 40 that also includes a perforated liner 450 to allow water or gas to enter the bore. The well bore walls 445 have a build-up of filtercake 440 which is maintained in liquid form by the returning fluid additive 435 to prevent collapse and closing of the subterranean bore 40. The drilling fluid 435 is returned to a separator (not shown) for recycling.

Figure 5:
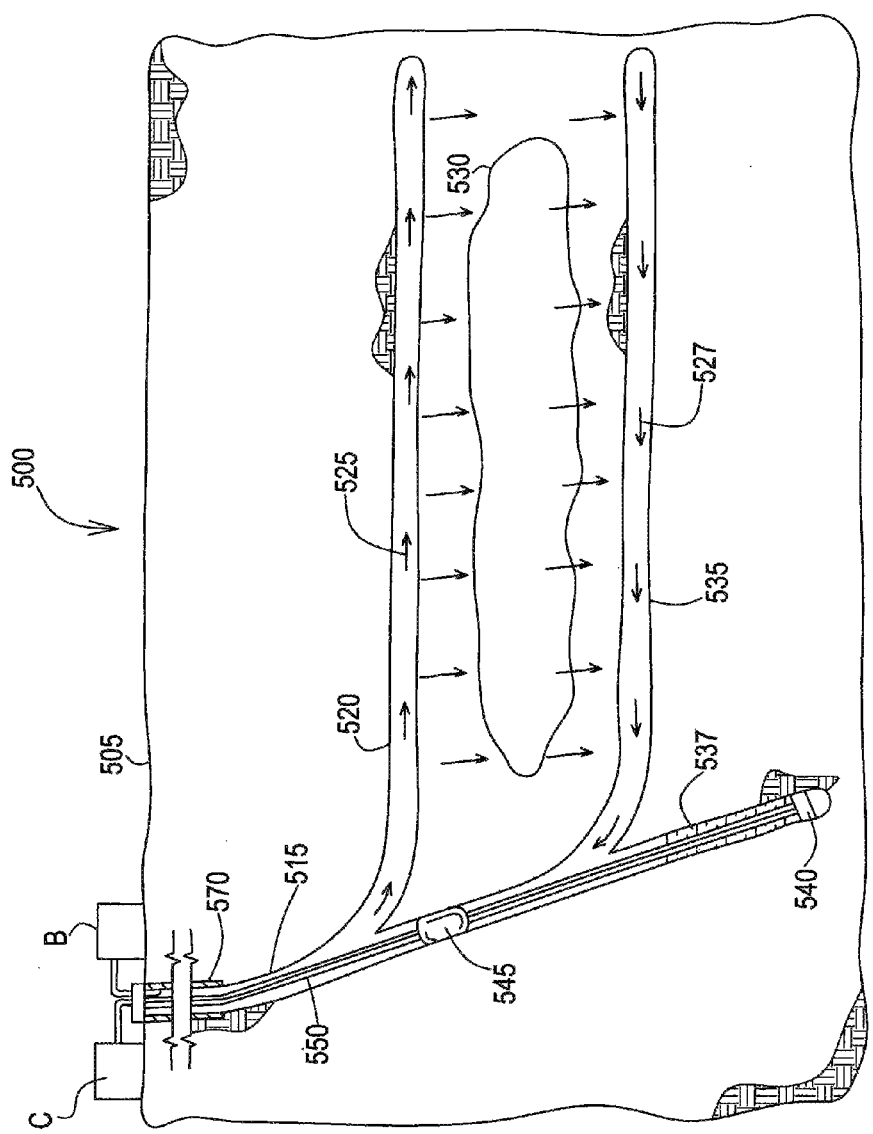
FIG. 5 is a cross-sectional view of a second embodiment of a drilling scheme that allows the fracture of the area around a subterranean reservoir resulting in increased flow into the wellbore.

FIG. 5 shows another drilling pattern as disclosed in U.S. Pat. No. 7,360,595 to J. A. Zupanick et al. In FIG. 5, a cross-sectional view of a system 500 for underground treatment of a subterranean formation is shown with a plurality of lateral bores extending from one main bore. After selection of a site with surface 505, an entry well bore 570 is formed, then a slant well 515 extends to wellbore pattern 520 which carries injection or drilling fluid 525 that fractures or crack the formation around the subterranean reservoir 530 which provides a fluid flow into a second lateral bore 535 that returns the injection fluid to an extended portion 537 of the slant well 515. A movable packer 545 along pipe 550 is used to direct the injection fluid 525 into the first lateral bore 520; the packer 545 is moved into the extended portion 537 where a subsurface pump 540 assists the return of injection fluid to the surface for recycling. At the surface, a storage tank for unused LpHAC B is used to store the injection fluid 525 and the used LpHAC 527 is returned to storage tank C for recycling.

FIGS. 4 and 5 illustrate how the injection fluid of the present invention can be used in existing drilling patterns and well bores to break up filtercake, stimulate well production without modifications to existing drilling patterns, equipment or the like.

In a process known as hydraulic fracturing with an acid, a low pH acidic composition (LpHAC) is incorporated into an aqueous based fluid in an amount ranging from approximately 10 weight % to approximately 40 weight % preferably approximately 20 weight % of the total fluid mixture, which is then mixed with proppants, such as, sand, ceramic beads or polymeric beads. The mixture of LpHAC, water and proppant is injected into the well bore under pressure in a range from approximately 5 pounds per square inch (psi) to approximately 10,000 psi and with sufficient volume to cause fissures in the wall formation of the reservoir. Once the fissures or cracks are formed, the proppant fills voids created and, literally, props or holds open the void so that the reservoir walls are more permeable and the flow of gas or oil from the reservoir to the well bore is greatly increased. The proppant remains in place once the hydraulic pressure is removed and continues to prop open the fracture and enhance flow of fluid into the well bore.

Generally, limestone, silica (sand), dolomite respond better to an aqueous mixture and shale formations are preferably penetrated and fractured with an oil based mixture of the low pH acid and proppant.

Example 4

Well Stimulation Additive with Water

| Example 4 - Well Stimulation Additive with Water | | |
|---|---|---|
| Compound | Weight Percent Range | Preferred Weight Percent |
| Low pH acid product (LpHAC) | 10% to 30% | 20% |
| Proppant | 30 to 60% | 45% |
| Water | 60% to 10% | 35% |

A completed well is injected with the aqueous based fluid containing ceramic beads or polymeric beads or other suitable proppant, under pressure in a range of approximately 5 psi to approximately 10,000 psi and under sufficient volume to cause fissures in limestone, silica (sand) and dolomite formations.

Example 5

Well Stimulation Additive with Oil

Example 5 - Well Stimulation Additive with Oil

| Compound | Weight Percent Range | Preferred Weight Percent |
|---|---|---|
| Low pH acid product (LpHAC) | 10% to 35% | 25% |
| Proppant | 30% to 60% | 45% |
| Oil | 60% to 5% | 30% |

A completed well is injected with the oil based fluid, wherein the oil is diesel or crude oil, containing ceramic beads or polymeric beads or other suitable proppant, under pressure in a range of approximately 5 psi to approximately 10,000 psi and under sufficient volume to cause fissures in shale formations.

Example 6

Well Stimulation Additive with Oil and Water

Example 6 - Well Stimulation Additive with Oil and Water

| Compound | Weight Percent Range | Preferred Weight Percent |
|---|---|---|
| Low pH acid product (LpHAC) | 10% to 35% | 25% |
| Proppant | 30% to 60% | 45% |
| Oil and Water | 60% to 5% | 30% |

The low pH acid composition in Examples 3, 4 and 5 above chemically dissolves the formation, causing cracks in the formation, allowing oil and gas flow to the well bore more freely, where capture takes place. The combination of oil and water as the fluid base is useful in unusual subterranean formations that include layers of shale.

The low pH acid composition of the present invention remains stable and effective in high temperature conditions of approximately 150° F. to approximately 400° F. that are encountered in subterranean wells. It is noted acids used in prior art well stimulation processes, such as hydrochloric acid and sulfuric acid lose effectiveness at high temperatures. For example between approximately 140° F. to approximately 160° F. hydrochloric acid loses effectiveness; and at temperatures of approximately 200° F. the effectiveness of sulfuric acid is reduced.

The proppant is used to hold open the fissures created by the acid effect of the LpHAC. Rock formations are primarily carbonates from limestone, gypsum and the like. The carbonates are pH sensitive and when contacted with an acid, will crumble or break. The acid reacts with the carbonate in an effervescent manner, releasing carbon dioxide ($CO_2$) within the formation and thereby forming voids.

First, select a formation to be treated. In treatment zones having significant shale formations, oil based stimulant is preferred, whereas, zones with limestone, silica (sand) and dolomite are preferably treated with water based stimulant.

All formations are acceptable to use in this process, softer formations, such as limestone and sand, will of course be more acceptable. Higher density formation rock will take more pressure, higher flow rate and require the well stimulant to stand longer in the formation before being returned to the surface.

In general, the use of drilling fluid of the present invention and a proppant should include the following steps. First, mix LpHAC stimulant or drilling fluid with a quantity of water, oil, or synthetic fluid, a proppant, such as a ceramic or polymer bead and a quantity of a low pH acid composition (LpHAC) prepared by combining a strong, low pH acid, selected from at least one of, 98% purity sulfuric acid, phosphoric acid, fumaric acid or acetic acid with water, preferably distilled water, deionized water, filtered water or the like and an ammonium compound or urea or metallic sulfate, such as, sodium sulfate or sodium bisulfate to provide mixture (I), combining mixture (I) in a pressurized vessel and heating the mixture to temperatures in a range between approximately 200 F and approximately 800 F, then cooling the mixture and stabilizing the mixture with a stabilizing amount of the starting mixture (I). The LpHAC mixture prepared according to the process of the present invention has a pH of less than 2.

Next, determine a preferred pump rate along with the volume of fluid to be mixed with LpHAC stimulant. Then, pump the LpHAC fluid stimulant mixture down hole at high rate and high pressure to fracture the formation containing a reservoir of oil or gas or both oil and gas.

The LpHAC fluid stimulant is pumped through the production tubing, out through the perforations in the well casing, into the reservoir formation. Once pumped into the production tubing there is no other place for the fluid to go, except through the casing perforations. It cannot travel up the space between the tubing because the casing has a packer set up above the well perforations.

Continue pumping LpHAC fluid stimulant until the fluid mixture is depleted. Depending on the type of formation, the well is shut-in and allowed to stand for a given period of time or the stimulation process can continue.

After completing the pumping of LpHAC fluid stimulant or stand time, if any, the LpHAC in the pumped fluid stimulant dissolves or fractures the formation, the well is opened up to recover the pumped fluid, leaving the proppants to hold open the fissures or fractures in the formation.

After the LpHAC product of the present invention has had stand time within the formation, recovery is by standard production operations known in the art. If the well is free flowing, the volume of first returns will be the spent fluid and is captured in a "frac" tank or can be run through the production operation and treated as salt water. The formation will neutralize the acid effect of the fluid.

A separate tank of either water, oil or oil and water mixture is used to inject water, oil or both fluids into the well to displace or clean the production tubes and clear the perforations in the pipeline and allow the oil or gas production fluid to flow from the reservoir into the pipeline, thereby increasing and enhancing the barrel per day production rate of the well.

Figure 6:
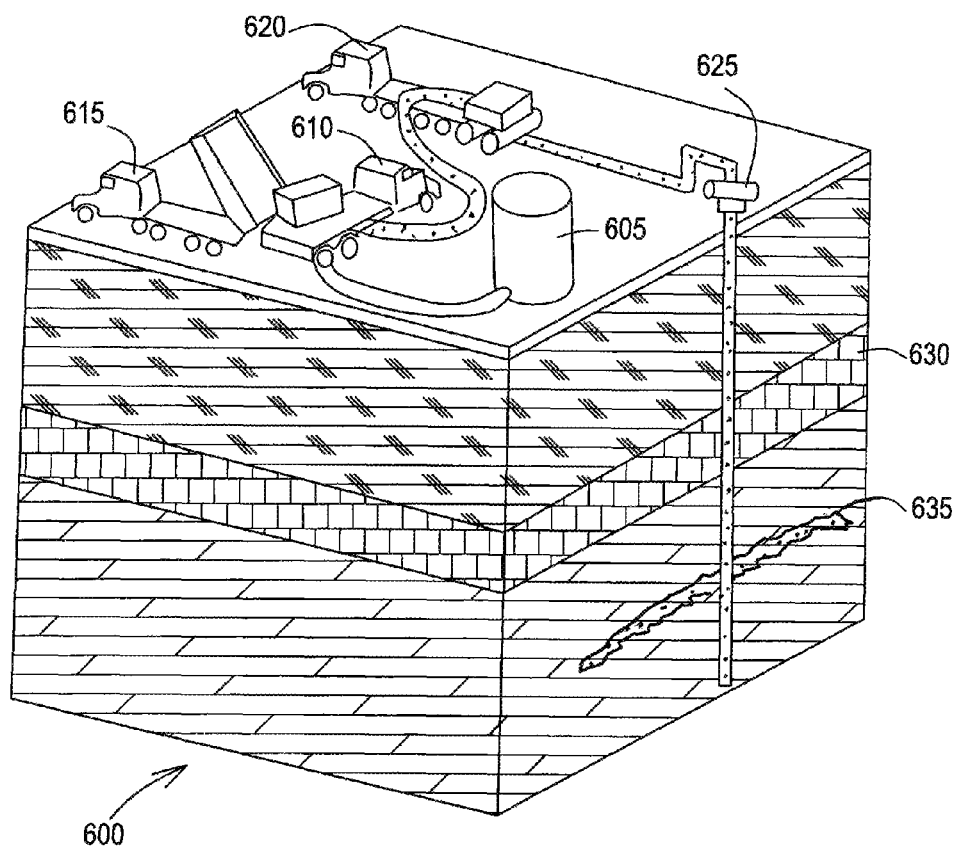
FIG. 6 is a schematic illustration of the use of the well stimulation additive of the present invention in a hydraulic fracturing operation to increase voids in the formation
Figure 6A:
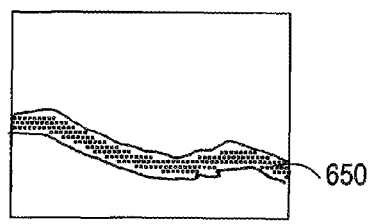
FIG. 6A is an inset that shows how the proppant is used to keep the fracture open and thereby increase fluid flow from the reservoir into a pipeline.

A specific example of the use of the drilling fluid/stimulant of the present invention and a proppant is shown in FIG. 6. At a selected drilling site 600, a series of trucks and tanks are assembled on the site surface. First there is a drilling fluid tank 605 connected by a hose to a blender truck 610. A sand (proppant) truck 615 dumps a load of sand or proppant into the blender truck 610. Drilling fluid and proppant are blended and fed to a pumper truck 620. The pumper truck 620 moves drilling fluid and proppant mixture to subterranean pump 625 that pumps the mixture down a vertical well bore though a reservoir producing formation 630 into a subterranean area below the reservoir producing formation 630 to cause a fracture 635 created by the high pressure fluid. In FIG. 6A, an enlarged drawing of the fracture shows the proppant 650 within the fracture or crack. The proppant keeps the fracture open allowing fluid flow into the reservoir and an increase in well production.

The proppant is not recovered; it stays in the formation as shown in FIG. 6A. The rationale for using a prop agent is to create high permeability for the oil/water/gas within the reservoir.

Thus, when an oil or gas-bearing formation contains large quantities of oil or gas, but has a poor flow rate due to low permeability, or from damage or clogging of the formation during drilling, the stimulation fluid of the present invention, can be used in both acidizing and hydraulic fracturing.

Acidizing involves pumping acid (usually hydrocholoric acid) into the formation. The acid dissolves some of the rock material so that the rock pores open and fluid flows more quickly into the well. Fracking and acidizing are sometimes performed simultaneously, in an acid fracture treatment.

Fracking, the informal term used for hydraulic fracturing, is used in the present invention to create fractures by using a mixture of water, proppants (sand or ceramic beads) and chemicals pumped into rock or coal formation.

Eventually, the formation will not be able to absorb the fluid as quickly as it is being injected. At this point, the pressure created causes the formation to crack or fracture. The fractures are held open by the proppants, and the oil or gas is then able to flow through the fractures to the well. Some of the fracturing fluids are pumped out of the well and into surface pits or tanks during the process of extracting oil, gas and any produced water, but studies have shown that anywhere from 20-40% of fracking fluids may remain underground. For economic reasons, the stimulation fluid of the present invention is recovered and reused; however, it is not a fluid that is harmful to animals, humans and wildlife when used in the amounts disclosed herein, and does not contain chemicals that are known to cause cancer. The stimulation fluid of the present invention is not combustible or flammable and is safely and easily transported.

Figure 7:
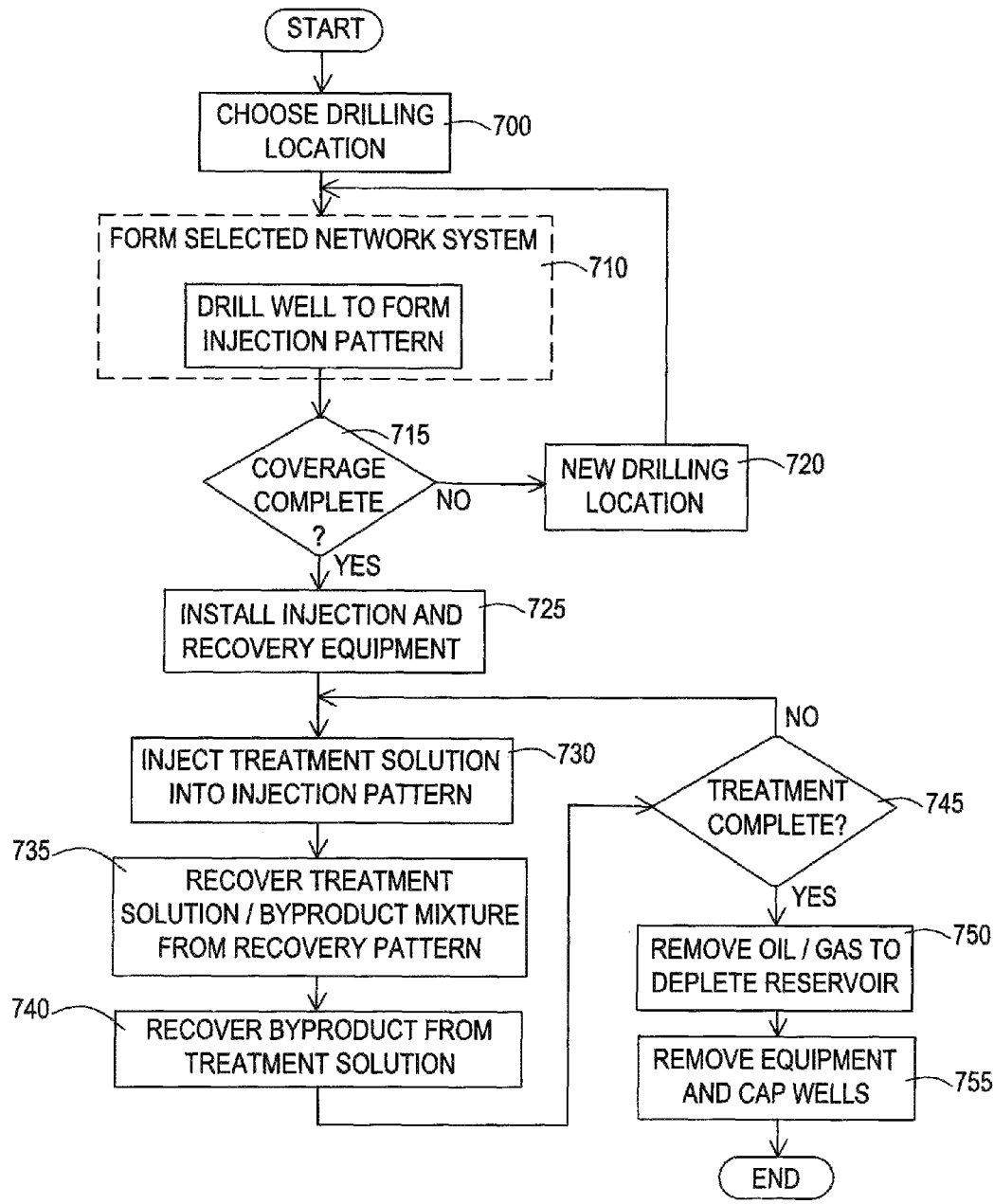
FIG. 7 is a flowchart of a process for well stimulation with the additive product of the present invention.

FIG. 7 is a flow chart of the process for using the stuck pipe and well stimulation additive of the present invention. Begin by choosing a drilling location 700 select the appropriate or recommended well bore injection pattern 710. If coverage of the subterranean formation is complete, proceed with installing the injection and recovery equipment 725; otherwise find a new drilling location 720.

The installation of injection equipment 725 follows the completion of a satisfactory injection pattern. When the injection and recovery equipment are installed, proceed to inject the treatment solution 730, recover treatment solution 735, and recover byproduct from treatment solution until treatment is complete 745. After treatment, remove oil, gas or other resources to deplete the reservoir 750; then remove equipment and cap well 755.

The process is the same for both vertical and horizontal wells. It will work with both. The invention will work in all well situations, except in a depleted well, of course.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A method for stimulating the production of a subterranean oil or gas well, comprising the steps of:
   (a) selecting a subterranean zone with underground resources in a reservoir that is penetrated by a well bore;
   (b) preparing a mixture of a stimulation fluid consisting of:
   a non-toxic, low pH acidic composition with antimicrobial properties prepared by the process of combining a high purity acid with water and an ammonium compound or a metallic sulfate, heating the mixture to approximately 140° F. to form mixture (I), placing mixture (I) in a pressurized vessel and heating the mixture, under pressure, to temperatures in a range between approximately 200° F. and 400° F., then, cooling the mixture, after the mixture is cooled, adding a stabilizing amount of the starting mixture (I),
   an aqueous based continuous phase that has the characteristics of brine and
   a proppant; wherein the mixture has a pH of less than 6.5; and
   (c) pumping the mixture of step b) into the well bore under a predetermined pressure and in a predetermined volume to fracture the formation and permit the underground resource to flow from the reservoir into the well bore.

2. The method of claim 1, wherein the aqueous based continuous phase of the stimulating fluid is brine.

3. The method of claim 1, wherein the aqueous based continuous phase of the stimulating fluid is sea water.

4. The method of claim 3, wherein the low pH acidic composition is in a range between approximately 10 weight percent to approximately 40 weight percent of the total mixture of sea water and low pH acidic composition.

5. The method of claim 1, wherein the high purity acid is selected from the group consisting of sulfuric acid, phosphoric acid, fumaric acid and acetic acid.

6. The method of claim 1, wherein the ammonium compound is selected from the group consisting of anhydrous ammonia, ammonium sulfate and buffered ammonium nitrate.

7. The method of claim 1, wherein a metallic sulfate is added to the combination of acid and water.

8. The method of claim 7, wherein the metallic sulfate is selected from the group consisting of sodium sulfate, sodium bisulfate, magnesium sulfate, zinc sulfate, manganese sulfate, and copper sulfate.

9. A method for stimulating the production of a subterranean oil or gas well, comprising the steps of:
   (a) selecting a subterranean zone with underground resources in a reservoir that is in contact with a well bore;
   (b) preparing a mixture of a stimulation fluid consisting of:
   a non-toxic, low pH acidic composition with antimicrobial properties prepared by the process of combining a high purity acid with water and an ammonium compound, a metallic sulfate or an organic sulfate, heating the mixture to approximately 140° F. to form mixture (I), placing mixture (I) in a pressurized vessel and heating the mixture, under pressure, to temperatures in a range between approximately 200° F. and 400° F., then, cooling the mixture, after the mixture is cooled, adding a stabilizing amount of the starting mixture (I), an oil-based continuous phase, and a proppant;

(b) pumping the mixture of step b) into the well bore under a predetermined pressure and in a predetermined volume to fracture the formation and permit the underground resource to flow from the reservoir into the well bore.

10. The method of claim 9, wherein the oil-based continuous phase is at least one of diesel oil, crude oil, and a mixture thereof.

11. The method of claim 9, wherein the mixing ratio of oil phase to low pH acidic composition is in a range between approximately 10 weight % to approximately 35 weight % low pH acidic composition to the total weight of oil and low pH acidic composition.

12. The method of claim 9, wherein the mixture of oil and low pH acidic composition is pumped to the bottom of the drill pipe, through a casing and into a reservoir formation under pressures between approximately 5 psi and approximately 10,000 psi.

13. The method of claim 9, wherein the ammonium compound is selected from the group consisting of anhydrous ammonia, ammonium sulfate and buffered ammonium nitrate.

14. The method of claim 9, wherein the proppant is selected from the group consisting of sand, ceramic beads and polymeric beads.

15. The method of claim 9, wherein a metallic sulfate is used in place of the ammonium compound.

16. The method of claim 9, wherein the metallic sulfate is selected from the group consisting of sodium sulfate, sodium bisulfate, magnesium sulfate, zinc sulfate, manganese sulfate, and copper sulfate.

17. The method of claim 9, wherein the organic sulfate has a generic formula

C-H-O—S wherein C is carbon, H is hydrogen, O is oxygen and S is sulfur.

18. The method of claim 9, wherein the organic sulfate further includes an alkali metal selected from the group consisting of potassium and sodium.

* * * * *